Sept. 27, 1938. H. B. BABSON ET AL 2,131,423
COOLER FOR LIQUIDS
Filed March 20, 1936 2 Sheets-Sheet 1

Inventors:
Henry B. Babson
Chester A. Thomas
By:- Cox & Moore attys

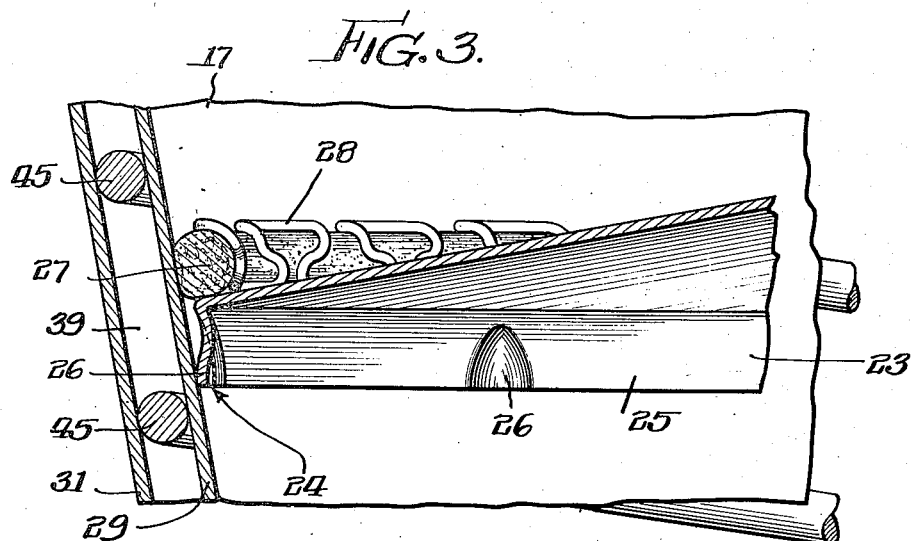
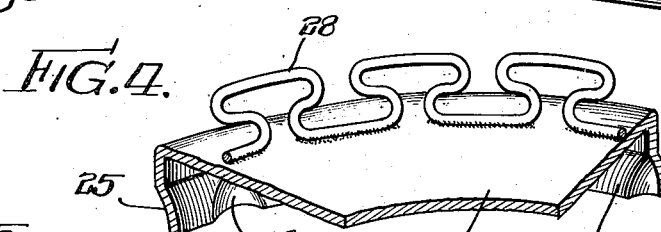
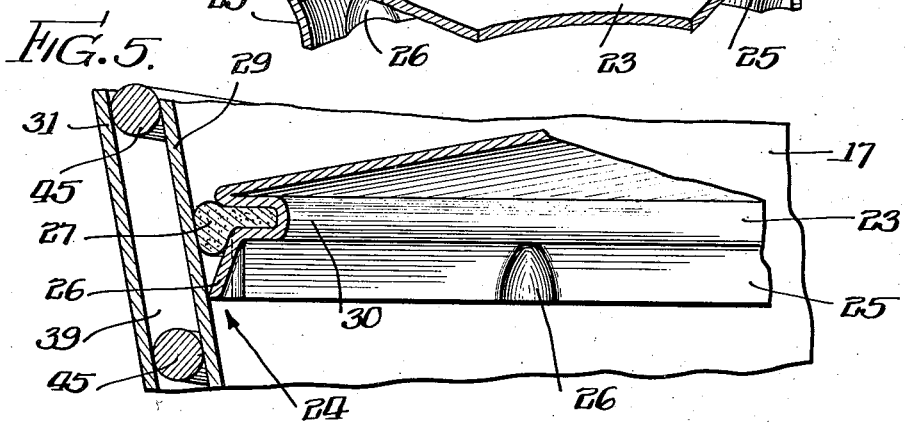
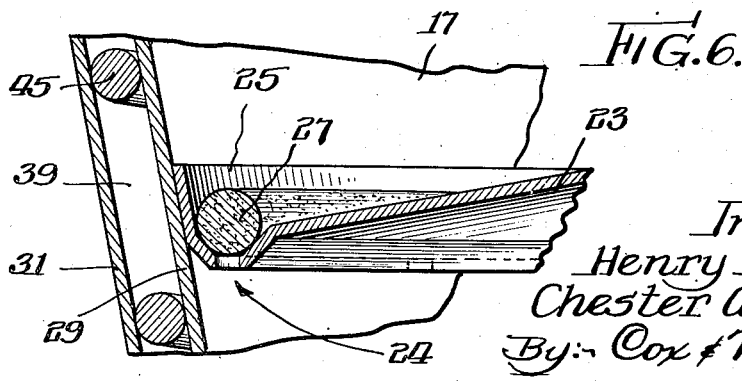

Patented Sept. 27, 1938

2,131,423

UNITED STATES PATENT OFFICE 2,131,423

COOLER FOR LIQUIDS

Henry B. Babson and Chester A. Thomas, Chicago, Ill.

Application March 20, 1936, Serial No. 69,817

9 Claims. (Cl. 31—4)

Our invention relates in general to equipment for the treatment of liquids and has more particular reference to a milk strainer and cooler.

An important object of our invention is to provide a simple and inexpensive device for cooling fluids and especially milk, wherein the liquid to be cooled is caused to travel in film-like condition over a cooled surface.

Another important object is to provide for filtering the liquid before the same is delivered for passage over the cooling surfaces.

Another important object is to provide a cooler comprising a housing having refrigerated walls, a partition in the housing, the partition providing a slot-like opening at its peripheral edge adjacent the walls of the housing whereby liquid to be cooled may be delivered in the housing on one side of the partition and be delivered through the slot with the edges of the partition in position to travel thence in film-like condition over the inner wall surfaces of the housing on the opposite side of the partition; a further object being to provide filtering means at the slot-like opening.

Among the other important objects is to provide for filtering and simultaneously cooling liquids by causing the same to flow in sheet-like form over enclosed refrigerated surfaces after and as a result of the filtering operation, whereby to accomplish efficient cooling and at the same time prevent the liquid from contamination after the filtering operation; to provide an inexpensive yet highly efficient milk cooler which functions incidentally as a filter and permits milk to be delivered directly to a can, after the filtering and cooling operation, thus permitting the milk to be quickly and efficiently refrigerated and delivered immediately into the can or container as an integral and inherent step in the filtering and cooling operation, whereby to eliminate the possibility of milk contamination after the filtering and cooling process; to provide a combined milk filter and cooler of utmost simplicity which may be cleaned easily, to thus facilitate the maintenance of sanitary conditions under which to accomplish the filtration and refrigeration of liquids under highly sanitary conditions.

Numerous other objects, advantages, and inherent functions of the invention will become apparent as the same is more fully understood from the following description which, taken with the accompanying drawings, discloses a preferred embodiment of our invention.

Referring to the drawings:

Figure 3 is an enlarged sectional view showing a modified construction;

Figure 4 is a perspective view of the form shown in Figure 3; and

Figures 5 and 6 are sectional views showing modified forms.

Figure 1:
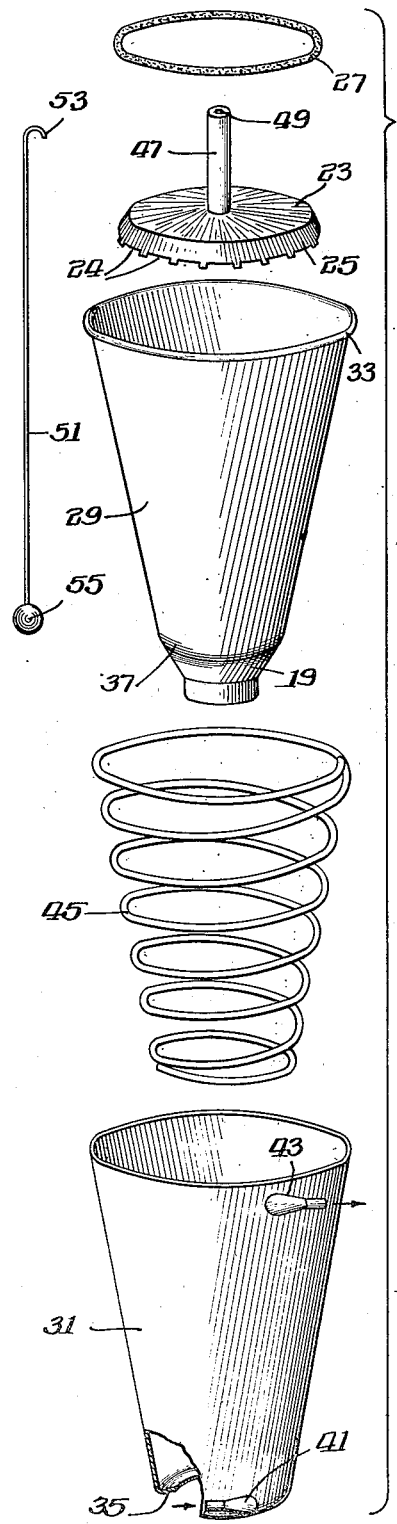
Figure 1 is an exploded view showing parts of a cooler embodying our present invention.

To illustrate our invention we have shown on the drawings a milk cooler 11 more especially adapted for use in dairy farms for the efficient cooling of milk and immediate delivery of the cooled milk into a receiver such as a milk can 13.

While we will describe our cooler more especially for use in the treatment of milk, it is obvious that the invention is not necessarily restricted to a milk cooler but its features may have application to the filtration and refrigeration of other liquids. In fact, our invention may be applied to advantage wherever it is desired to cool liquids efficiently.

The cooler 11 comprises essentially a sleeve-like housing, the walls of which are preferably conical, the smaller end being formed as at 19, to provide a funnel which may be shaped to fit into the mouth 15 of a milk can or other receptacle into which liquid refrigerated in the cooler may be discharged. The housing 17 may extend upwardly of the container 13 or other support on which it is mounted for operation, so that its upper and larger end 21 opens upwardly.

A partition element 23 is preferably removably mounted in the upper portions of the casing, the partition comprising a disk, the marginal edges of which are flanged as at 25 to provide seating means engaging the inner surfaces of the sleeve-like housing.

The marginal portions of the partition 23 may be cut away at intervals to provide openings or slots 24 through which milk or other liquid may pass the partition.

Figure 2:
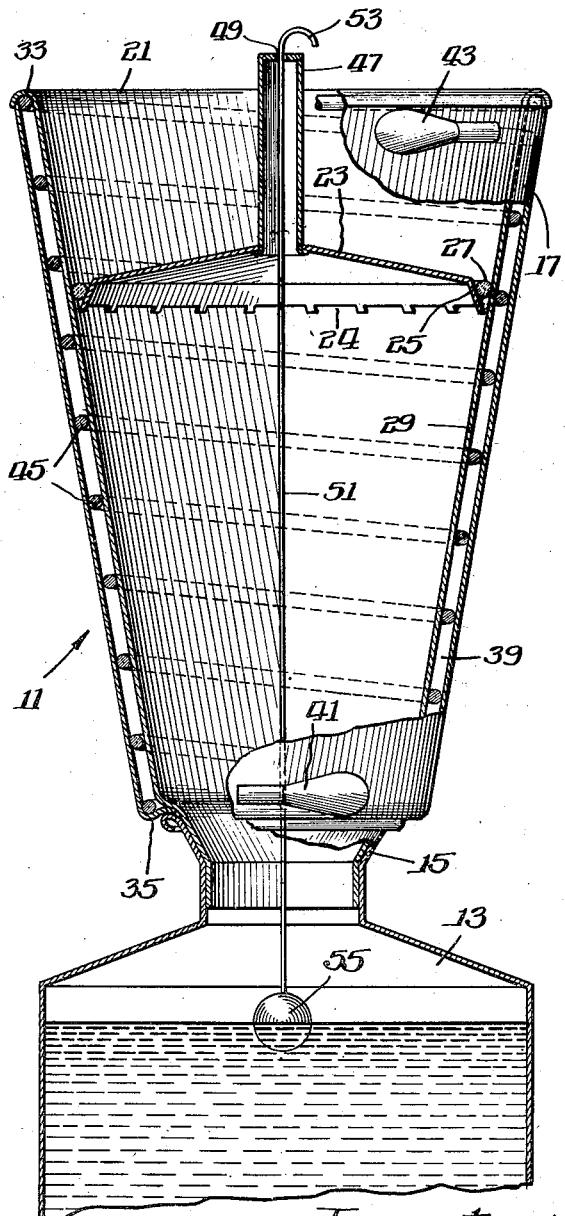
Figure 2 is a sectional view through the assembled cooler.

The slots 24 may be formed in the partition inwardly of the edge of the disk as shown in Figure 6 or as shown in Figure 2, the edges of the flange 25 may be cut away, or the flange formed with a series of pressed out portions 26 as shown in Figures 3 and 5 so that the openings are defined by and between the flange 25 and the wall of the housing. In Figure 2, the flange 25 makes, with the housing wall, a substantially annular V-shaped slot at the peripheral edges of the partition. In this slot we arrange an annular sealing element 27 which preferably comprises a suitable filter material such as cotton. If desired, the cotton may be supported on a net to facilitate handling and to prevent mechanical disintegration of the same.

In Figure 3 the filter gasket 27 is retained opposite the opening 24 by means of a holder 28, preferably comprising a wire secured on the partition 23 and arranged in loops positioned to overlie and hold the gasket in place opposite the opening 24.

In Figure 5 the partition is formed with a groove 30 adapted to receive and support the gasket 27 in position in the opening 24.

Milk or other liquid to be cooled may be poured into the housing 17 through the opening 21 and accumulate above the partition 23. Such liquid may, after passing the filter 27, pass downwardly through the partition openings so that the liquid is delivered in substantially sheet-like form upon the inner wall surfaces of the housing substantially throughout its entire circumference. The liquid so delivered will flow downwardly over inner wall surfaces of the housing 17 and be delivered and discharged at and through the opening at the lower end of the casing and fall thence into the milk can or other container 13 on which the cooler is mounted.

Means is provided for cooling the walls of the housing 17 and to this end we prefer to provide hollow walls through which a suitable cooling medium may be delivered. When used in a dairy for the cooling of milk, water may be employed as the cooling medium.

Any suitable hollow construction may of course be used for the housing 17, but we prefer to form the housing of a pair of co-operating shell-like elements 29 and 31. The element 29 comprises the inner wall of the housing and at one end forms the funnel 19, the other end being curled outwardly as at 33. The element 31 is of conical shape adapted to encircle and embrace the wall 29 and is formed preferably with an inturned flange 35 at its smaller end.

The shells are fitted together with the larger end of the outer shell 31 received within the curled flange 33 of the shell element 29 and the parts are secured together by sealing the flange 33 to the end of the shell 31 in any suitable fashion, as for example by soldering, brazing or welding.

The flange 35, when the parts are thus assembled, engages a shoulder 37 formed in the element 29 at the junction of the conical portion with the funnel portion 19 and the parts are or may be secured in any suitable fashion as by soldering, welding or brazing in order to interconnect the portions 29 and 31 to form the sleeve-like element 17 having hollow walls defining a space 39 through which a cooling medium may be circulated in order particularly to cool the inner wall element 29, and thus to refrigerate liquid flowing over the inner surface thereof as heretofore described.

The outer shell element 31 is or may be provided with an inlet construction 41 at or near the lower end of the element 17 and an outlet connection 43 at or near the opposite or upper end of the cooler. Water or other suitable cooling medium may be introduced to the space 39, flow upwardly through said space and be discharged through the outlet 43, suitable conduit means being employed to connect the inlet with a source of cooling medium and the outlet with a suitable discharge.

We prefer also to secure the wall elements 29 and 31 together intermediate the opposite ends of the cooler and also to provide means for causing the cooling medium to travel a tortuous path between the inlet connection 41 and the outlet connection 43. To this end a preferably helically arranged partition element comprising a wire or rod 45 suitably coiled is interposed in the space 39 between the wall elements 29 and 31. The wall elements 29 and 31 may be secured as by soldering or welding on opposite sides of the element 45 at intervals or throughout the length of the wire, which thus defines a helical path through the space 39 from the inlet 41 to the outlet 43. The cooling medium introduced at the inlet 41, therefore, is caused to travel helically in a tortuous or serpentine fashion through the space 39 to the outlet in order thus to afford a maximum cooling effect upon any liquid traversing the inner surfaces of the element 29.

It will be noted that the cooling medium is introduced at the lower end of the cooler and discharged at the upper end thereof in order that the liquid being cooled may, at its point of mergence into and through the discharge funnel 19, be subjected to a cooling effect at the lowest available temperature of the cooling medium.

The cooled milk may be discharged through the funnel 19 into the container 13 and we prefer to provide means for indicating the filled condition of the container 13. To this end the partition 23 may be provided with an upstanding tubular extension 47 preferably arranged centrally on the partition 23. This extension may form a handle for removing or otherwise manipulating the partition 23. The upper end of the tubular extension 47 may be closed by a cover having a small perforation 49. The depth gauge for indicating the filled condition of the container 13 may comprise a stem 51 preferably of wire extending through the cover and the opening 49, one end of the wire being bent or otherwise finished as at 53 in order to prevent it from falling through the opening 49. When the partition 23 is in place in the housing 17 the stem 51 may be extended downwardly through the housing, through the funnel 19 and into the container 13. The lower end of the stem is or may be fitted with a suitable float element 55 of any preferred form which, in the drawings, has been illustrated as a hollow sheet metal element. As the container 13 becomes filled with liquid the float element 55 will be raised carrying the stem 51 with it so that the filled condition of the container 13 may be determined by noting the upward movement of the stem through the opening 49.

We have found that a cooler constructed in accordance with the present disclosure has unusual cooling efficiency; that this efficiency is effected more particularly because the liquid being cooled is caused to flow in thin, film-like condition over the cooling surfaces of the element 29; that the distributing disk or partition 23 and the sealing and filtering element 27 contribute to the efficiency of the device in no small part in that these elements not only cause the liquid to flow over the cooling surfaces in film-like condition but also filter the liquid and form a closure which separates the filtered from the unfiltered liquid and prevents foreign matter from reaching the liquid after it has passed the filter and entered the cooling chamber below the partition 23. The device is unusually effective as a cooling and filtration device for milk, especially since the milk can be maintained in filtered sanitary condition during the cooling operation and may be delivered in cooled condition immediately into a milk can.

A further advantage of course resides in building a float gauge directly into the cooler whereby an indication may be had of the filled condition of the milk can or other container into which the cooler discharges the liquid.

The filter element 27 also insures that the liquid is projected onto the walls uniformly and insures against the liquid washing through the openings 24 too rapidly, without however requiring accuracy in making the parts defining the openings.

The device is of unusually inexpensive construction, is simple and lends itself readily to cleaning since the partition 23 is readily removable and there are no pockets or corners making difficult the cleansing of the parts.

It is thought that the invention and its numerous attendant advantages will be fully understood from the foregoing description, and it is obvious that numerous changes may be made in the form, construction and arrangement of the several parts without departing from the spirit of the invention or sacrificing its attendant advantages, the form herein described being merely a preferred embodiment for the purpose of demonstrating the invention.

Having thus described our invention, what we claim as new and desire to secure by Letters Patent is as follows:

1. A cooler for liquids comprising a sleeve-like housing having hollow walls for the circulation of a cooling medium, and liquid distributing means within said housing and comprising a removable partition having edges formed at intervals with projections adapted to engage with the inner walls of said housing whereby to form, between the edge of said partition and the walls of said housing, an elongated slot terminating at its opposite ends at said projections, and through which slot liquid, introduced into the housing on one side of the partition, may be delivered thence through the slot peripherally of the partition onto the inner walls of the housing to flow in film-like condition over said walls on the opposite side of said partition.

2. A cooler for liquids comprising a sleeve-like housing having hollow walls for the circulation of a cooling medium, liquid distributing means within said housing and comprising a removable partition having edges formed at intervals with projections adapted to engage with the inner walls of said housing whereby to form, between the edge of said partition and the walls of said housing, an elongated slot terminating at its opposite ends at said projections, and through which slot whereby liquid, introduced into the housing on one side of the partition, may be delivered thence through the slot peripherally of the partition onto the inner walls of the housing to flow in film-like condition over said walls on the opposite side of said partition, and means on said partition for holding a filtering gasket in said slot.

3. A cooler for liquids comprising a sleeve-like housing, means to cool the walls of said housing, a partition element comprising a disk adapted for removable arrangement within the said housing, said disk having a dependent marginal flange forming a V-shaped groove with the walls of said housing, and means on said disk for mounting a filter element removably on the disk in filtering position in said groove, said flange being formed to provide an opening between its edge and the walls of the housing at the bottom of the groove whereby liquid delivered in said housing on one side of the partition may penetrate the filter element and thence through said openings and onto the walls of the housing in sheet-like form on the opposite side of the partition, and may flow over said walls and be cooled by contact therewith.

4. A cooler for liquids comprising a sleeve-like housing, means to cool the walls of said housing, a disk forming a partition in said housing, said disk being formed at its edges to provide an elongated slot-like opening adjacent the walls of the housing, and means on said disk providing an annular outwardly opening pocket forming a holder at the edge of the disk to removably support gasket means opposite said opening.

5. A cooler for liquids as set forth in claim 4, wherein said holder comprises a wire configurated to form a plurality of loops and secured on said disk at the edge thereof so that said loops collectively form the annular gasket-receiving pocket.

6. A cooler for liquids as set forth in claim 4, wherein said holder comprises marginal portions of said disk which are configurated to form an outwardly opening annular groove for the reception of the gasket.

7. A cooler for liquids as set forth in claim 4, wherein the disk is formed with spaced projections at its periphery for engagement with the wall of said housing to thereby define the slot-like opening between the wall of the housing and the edge of the disk between a pair of said projections.

8. A cooler for liquids as set forth in claim 4, wherein said slot-like opening comprises an elongated perforation in the disk spaced inwardly of and adjacent the marginal edge of the disk.

9. A filter for liquids comprising a tapering sleeve-like shell, a partition adapted for removable mounting in said shell with the edges of said partition in engagement with the walls of said shell to support the partition in assembled position, said partition being formed to provide a series of elongated slots in end to end relationship at the edge of said partition adjacent the walls of said shell, and means on said partition for holding a filtering gasket in position opposite said slots.

HENRY B. BABSON.
CHESTER A. THOMAS.